(12) United States Patent  (10) Patent No.: US 7,635,108 B2
Zeuner et al.  (45) Date of Patent: Dec. 22, 2009

(54) CABLE HOLDER FOR AIRCRAFT

(75) Inventors: Lutz Zeuner, Hardebek (DE);
Hans-Georg Plate, Roseburg (DE);
Lueder Kosiankowski, Jork (DE);
Hans-Peter Guthke, Buxtehude (DE)

(73) Assignee: Airbus Deutschland GmbH (DE)

( * ) Notice: Subject to any disclaimer, the term of this patent is extended or adjusted under 35 U.S.C. 154(b) by 198 days.

(21) Appl. No.: 11/073,991

(22) Filed: Mar. 7, 2005

(65) Prior Publication Data

US 2005/0211463 A1 Sep. 29, 2005

Related U.S. Application Data

(60) Provisional application No. 60/598,258, filed on Aug. 3, 2004.

(30) Foreign Application Priority Data

Mar. 8, 2004 (DE) .................. 10 2004 011 186

(51) Int. Cl.
*F16L 3/08* (2006.01)
(52) U.S. Cl. .................. 248/65; 248/68.1; 248/228.1
(58) Field of Classification Search ........... 248/58, 248/61, 62, 65, 68.1, 228.1, 228.6, 231.71, 248/316.1; 174/40 CC, 40 TD; 269/903; 254/134.3 C, 134.3 R
See application file for complete search history.

(56) References Cited

U.S. PATENT DOCUMENTS

| 802,103 | A | * | 10/1905 | Houghton | 248/72 |
|---|---|---|---|---|---|
| 1,797,214 | A | * | 3/1931 | Mayer et al. | 248/68.1 |
| 1,818,659 | A | * | 8/1931 | Tournier | 248/68.1 |
| 2,338,660 | A | * | 1/1944 | Morehouse | 248/68.1 |
| 2,354,404 | A | * | 7/1944 | Sayles | 248/72 |
| 2,628,800 | A | * | 2/1953 | Kindorf et al. | 248/72 |
| 2,671,625 | A | * | 3/1954 | Buckley | 248/58 |
| 3,146,982 | A | * | 9/1964 | Budnick | 248/68.1 |
| 4,019,705 | A | * | 4/1977 | Habuda et al. | 248/58 |
| 4,717,102 | A | * | 1/1988 | Pflieger | 248/228.1 |
| 5,385,320 | A | * | 1/1995 | Ismert et al. | 248/62 |
| 5,947,424 | A | * | 9/1999 | Heath | 248/58 |
| 6,012,691 | A | * | 1/2000 | van Leeuwen et al. | 248/228.3 |
| 6,254,040 | B1 | * | 7/2001 | Mc Grath | 248/62 |
| 6,557,807 | B1 | * | 5/2003 | Belanger | 248/215 |
| 6,959,898 | B1 | * | 11/2005 | Laughlin et al. | 248/60 |
| 6,994,300 | B2 | * | 2/2006 | Labeirie et al. | 248/70 |
| 2003/0218111 | A1 | | 11/2003 | Labeirie et al. | |
| 2006/0016937 | A1 | * | 1/2006 | Plate et al. | 248/58 |

FOREIGN PATENT DOCUMENTS

| DE | 8627194 U1 | 10/1986 |
|---|---|---|
| DE | 695 16575 T2 | 3/1995 |
| EP | 1 367 308 A1 | 12/2003 |
| GB | 2049019 A1 * | 12/1980 |
| JP | 09-317950 A | 12/1997 |

* cited by examiner

*Primary Examiner*—Alfred Joseph Wujciak, III
(74) *Attorney, Agent, or Firm*—Lerner, David, Littenberg, Krumholz & Mentlik, LLP

(57) ABSTRACT

A cable holder for aircraft comprising a cable receiver section and a main body. The main body is provided with a fastening section to be placed on a surface. The cable holder is essentially made of plastic. In this way, a cable holder is provided, which is easy to manufacture cost-effectively and may be attached to surfaces of greatly varying dimensions.

5 Claims, 4 Drawing Sheets

CABLE HOLDER FOR AIRCRAFT

CROSS-REFERENCE TO RELATED APPLICATIONS

This application claims the benefit of the filing date of U.S. Provisional Patent Application No. 60/598,258 filed Aug. 3, 2004, the disclosure of which is hereby incorporated herein by reference.

BACKGROUND OF THE INVENTION

The present invention relates to cable holder or line holder for aircraft. The present invention particularly relates to a cable holder for aircraft, a method for attaching a cable holder to a support in an aircraft, and an aircraft comprising a corresponding cable holder.

In aircraft, cable holder are used for holding, guiding, and fastening electrical line routes in different regions. Typically, cable holder made of metal are currently used, which are fastened to supports of the aircraft using screws or rivets. In this case, the fastening of such line bundles to the support is time-consuming and work-intensive.

SUMMARY OF THE INVENTION

According to one exemplary embodiment of the present invention, a cable holder for aircraft is provided comprising a cable receiver section and a main body. The main body may have a fastening section to be placed on a surface, for example of a support. According to an exemplary embodiment of the present invention, the cable holder may essentially be made of plastic.

Thus, the invention provides a cable holder for aircraft which is attachable in a simple way.

Through the implementation of the fastening section to be placed on a surface, the cable holder according to this exemplary embodiment may be attached to manifold support structures. This cable holder may also be attached to supports of different dimensions, since such supports typically always have a section which is planar.

In this way, it may not be necessary to provide a new cable holder for each new application; complex changes of injection moulds may also be avoided.

The cable holder may particularly be implemented for line routes which are very heavy. Such line routes have cable diameters from 30 to 40 mm, for example. However, the cable holder may also be implemented for larger cable routes.

According to an exemplary embodiment of the present invention, plastics may be used, such as PAEK, which are light and nonetheless resistant to high temperatures and therefore fulfill the requirements in aircraft construction.

According to a further exemplary embodiment of the present invention, the cable holder may be implemented in such a way that it is attachable to a surface pointing downward. The cable receiver section may have a first and a second region for receiving cables. If the cable holder is attached to the surface pointing downward, the first and the second regions are aligned essentially horizontally, so that the cable may be laid on the first and second regions.

This may allow simple mounting, for example. In this case, the cable holder may be attached first. The cable may then be laid on the first and second regions, aligned, and stretched. The cable may lie on the first and second regions in this case and its intrinsic weight is held by these regions. After proper alignment and stretching, cable binders may then be used, for example, in order to fix the cable in the cable receiver section.

According to a further exemplary embodiment of the present invention, the fastening section may have a recess for attaching the cable holder to a surface pointing essentially downward using a screw, rivet, self-locking socket pin, or similar fastener.

A multifunctional cable holder, which is attachable to multiple surfaces in the aircraft, is thus advantageously specified.

According to a further exemplary embodiment of the present invention, the cable receiver section and/or the first and the second regions may be implemented so that cables having a diameter up to 50 mm may be laid. The first and second regions may be implemented to receive line routes having a diameter from 25 to 40 mm. An implementation for routes having a diameter between 15 and 50 mm is also possible. This concept is applicable under the aspect of safety for separating routes/lines to avoid signal interference (influence of the EMC) and to maintain a safety distance.

Cable routes or cables are to be understood here as bundled individual flexible leads, single lines having multiple different lines, or even combinations of bus systems with lines or cables. Even a power cable having a corresponding copper diameter is to be understood among this group.

According to a further exemplary embodiment of the present invention, the cable holder may be implemented for attachment to a support which has a section that is essentially rectangular. In a double T-shaped support, the ends of the T-bars are typically provided with a section which is essentially rectangular. According to the cable holder of this exemplary embodiment, at least one claw element can be provided on the fastening section on one side, which is implemented to at least partially enclose the rectangular section. For example, this claw element may be implemented so that it contacts the rectangular section on at least two opposing surfaces.

In addition, an opening may be provided on the fastening section in order to fix the fastening section to the support using a screw, rivet, self-locking socket pin, or similar fastener.

A cable holder which is simple to mount may thus be specified, for example. The claw element may be put on the rectangular section of the support. In this case, the claw element may be implemented so that by being put on the cable holder is already supported on the support in such a way that its intrinsic weight is supported. For this purpose, the claw element may be provided with two surfaces which may be essentially tailored to the dimensions of two parallel surfaces of the section, for example. The two surfaces of the claw element may also be implemented in such a way that their distance may be reduced, through which the claw element may be put on the section of the support and clamped in place.

For the final attachment of the cable holder, a recess may then be provided, by means of which the cable holder may be fixed to the support using a screw, rivet, self-locking socket pin, or similar means.

According to a further exemplary embodiment of the present invention, the cable holder may have a structure similar to an inverse T when it is attached to the surface pointing downward. The first and the second regions, on which the cables or line routes may be laid, may then be provided on the essentially horizontally oriented support.

According to a further exemplary embodiment of the present invention, a method is specified for attaching a cable holder to a support in an aircraft. Firstly, a claw element of the cable holder may be pushed onto a rectangular section of the support. The cable holder is then fixed on the support using a screw, rivet, or self-locking socket pin.

According to this exemplary embodiment of the present invention, a simple and rapid method is specified in which the cable holder may be pushed onto a transverse support belt of a support, for example, and then attached using clip nut and screw, for example. By using the claw element on one end of the holder, for example, according to one exemplary embodiment, a second hole and a second screw or similar fastener may be dispensible.

BRIEF DESCRIPTION OF THE DRAWINGS

In the following, the present invention will be described with reference to the figures of preferred exemplary embodiments.

DETAILED DESCRIPTION

In the following description of the figures, identical reference numbers are used for identical or similar elements.

Figure 1:
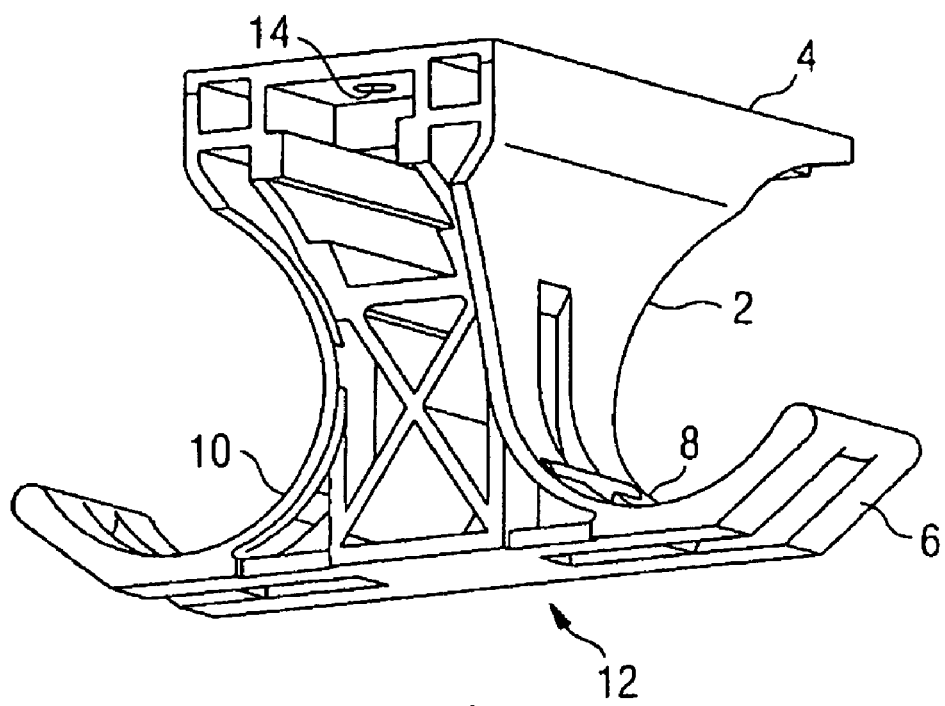
FIG. 1 shows a schematic first perspective view of a cable holder according to an exemplary embodiment of the present invention.

FIG. 1 shows a first perspective view of a first exemplary embodiment of the cable holder according to the present invention. As may be inferred from FIG. 1, the cable holder has a main body 2, a fastening section 4 for placement on a surface, and a cable receiver section 6. The cable receiver section 6 has a first region 8 and a second region 10, on which cable may be laid. As may be inferred from FIG. 1, the first and second regions 8, 10 may have the shape of a segment of a circle, which may be tailored to a diameter of the cable to be positioned thereon. FIG. 1 shows the cable holder in an orientation essentially as it is attached to a support. In this orientation, the first region 8 and the second region 10 are positioned essentially horizontally. The main body 2 is connected to the cable holder 6 at a location 12, which lies essentially in the middle between the first and second regions 8, 10.

The fastening section 4 is essentially implemented in this exemplary embodiment as a surface. However, the fastening section 4 may also be implemented using three contact points, which may then be placed on a surface to which the cable holder is to be attached.

The reference number 14 in FIG. 1 identifies a recess, in the present case a hole or bore, through which a screw, rivet, a self-locking socket pin, or a similar fastener may be guided, which may then be fastened in a corresponding recess in the surface. Multiple recesses 14 may be provided.

Through the implementation according to the present invention of the fastening section 4, the cable holder may be placed on multiple surfaces of greatly varying dimensions. For example, the cable holder may be attached in aircraft to supports having different widths. Thus, for example, web thicknesses of supports may be covered over large ranges.

A screw-nut connection may be provided as the screw connection, however, clip nut-clip connections or clip nuts may also be used.

In the orientation shown in FIG. 1, the cable holder may be attached from below to a support of the aircraft which also supports the floor of the passenger cabin, for example. In other words, the cable holder may then be attached suspended and the line routes or cables may already lie on the first and second regions 8 and 10 because of their intrinsic weight. This allows simple mounting, since the cable holder may be mounted first and the cables may then be laid on the cable receiver section 6. It is then possible to clamp and/or align the cables and then fasten them to the cable holder using a cable binder, for example.

Providing the two regions 8 and 10 allows the separation (spatial separation) of line rods or routes. This may allow signal interference from one line to the other through EMC to be avoided. A safety interval between lines on the regions 8 and 10 may thus be set in this way.

According to this exemplary embodiment, the cable holder may be made of plastic. The cable holder may be manufactured using an injection molding method, for example. Possible plastic materials are, for example, PEAK, PEEK, PEI, PA.

Figure 2:
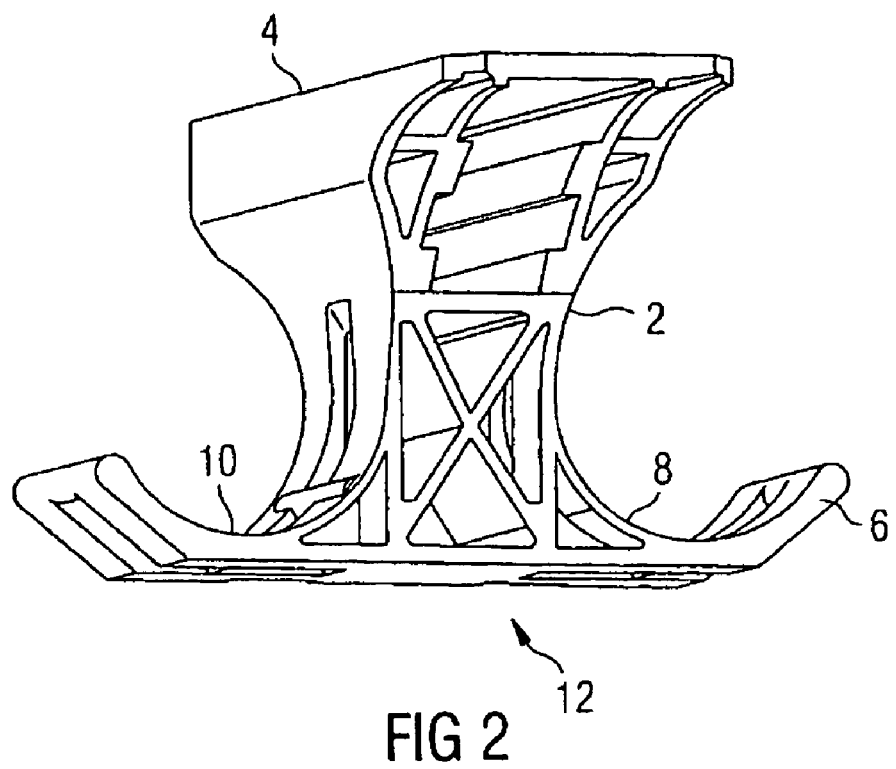
FIG. 2 shows a second perspective view of the cable holder from FIG. 1.

FIG. 2 shows a second perspective view of the cable holder from FIG. 1. As may be inferred from FIG. 2, the cable holder may be, for weight optimization, stiffened using supporting framework structures. Thus, recesses may be provided on less loaded regions and support or reinforcement struts may be provided on more strongly loaded regions.

Figure 3:
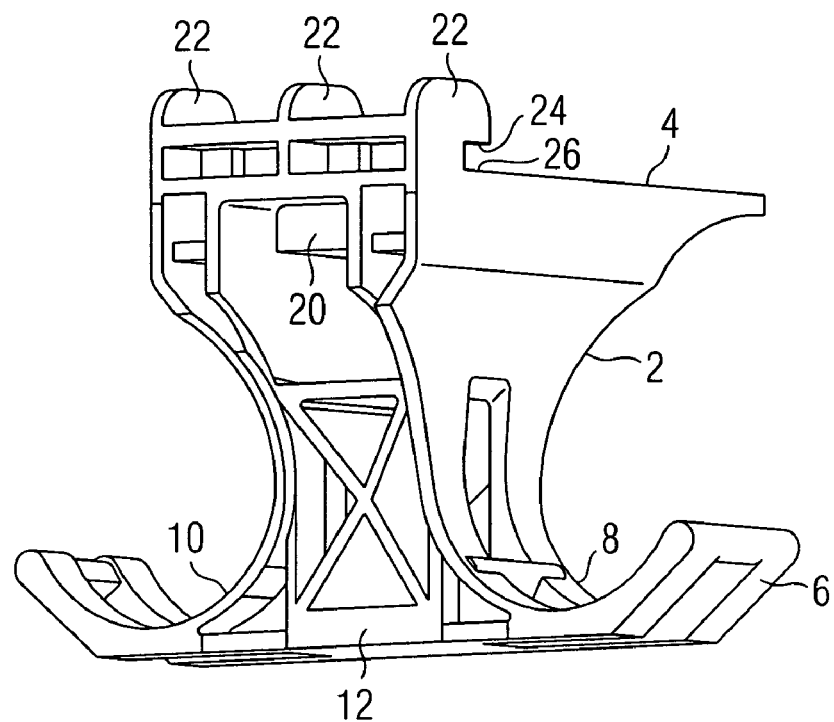
FIG. 3 shows a perspective view of a further exemplary embodiment of the cable holder of the present invention.

FIG. 3 shows a perspective view of a second exemplary embodiment of a cable holder for aircraft according to the present invention. The cable holder shown in FIG. 3 essentially has a similar construction to the cable holder shown in FIG. 1. However, a claw element 22 may be provided. The claw element 22 is implemented to be slided or put onto a rectangular section of a support. For this purpose, the claw element 22 has a first planar region 24 and a second planar region 26. A distance between these planar regions 24 and 26 is essentially tailored to a thickness of the rectangular section. In the exemplary embodiment shown FIG. 3, the planar regions 24 and 26 are positioned essentially parallel to one another.

In a variation of this exemplary embodiment, the planar regions 24, 26 are set at a small angle in relation to one another. The cable holder is thus clamped in place on the support when it is put onto the rectangular region.

A corresponding recess, similar to the recess 14, may then be provided for fastening the cable holder to the support, through which a screw may then be inserted in order to fasten the cable holder to the support. According to this exemplary embodiment, it may be possible to first put the cable holder onto the support. Only one screw may then be sufficient in order to finally fasten the cable holder to the support, for example.

Furthermore, a spring element 20 may be provided in order to allow the cable holder to be held on the rectangular section by working together with the claw element 22.

It is also possible to provide a plurality of claw elements 22.

Figure 4:
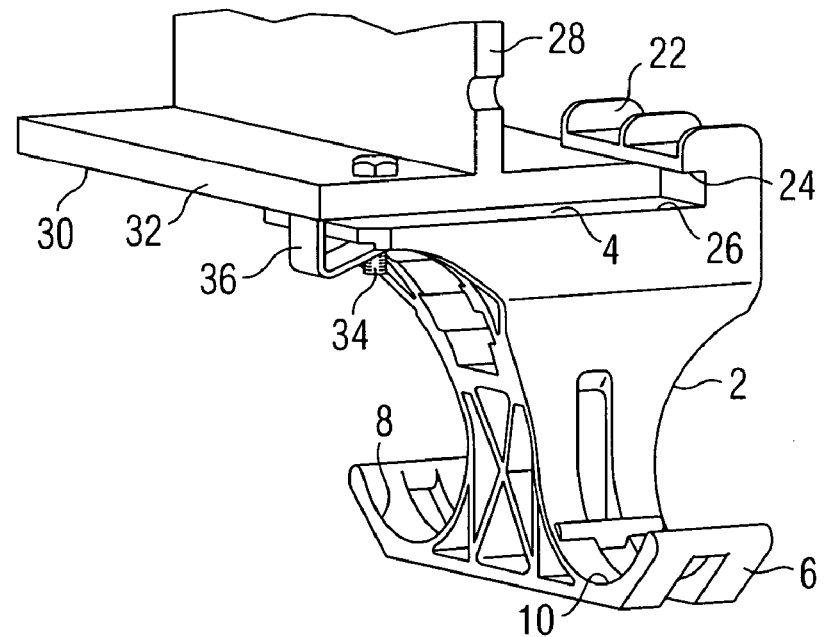
FIG. 4 shows a perspective view of the cable holder from FIG. 3 in a state mounted on a support.

FIG. 4 shows a further perspective view of the cable holder from FIG. 3, the cable holder being attached to a support 28.

As may be inferred from FIG. 4, the claw element 22 is put onto a rectangular region 32 of the support 28 in such a way that the surfaces in the regions 24 and 26 contact a rectangular region 32 on at least two opposing points. The claw region of the cable holder may be put on along the longitudinal direction of the support, but also essentially perpendicularly thereto.

As may be inferred from FIG. 4, the cable holder may be supported on the surface 30 of the support 28, which points essentially downward, using a screw 34, which is inserted through openings through the support 28 and the cable holder, and a clip nut 36 which works together therewith.

In contrast to the cable holder in FIG. 1, which is attachable to planar regions, but typically requires two attachment screws, rivets, or similar elements, by providing at least one claw element 22 according to the exemplary embodiment shown in FIG. 3, providing only one screw connection may be sufficient. The mounting may thus be simplified. In addition, a mounting time may be shortened.

Furthermore, the cable holder shown in FIG. 3, like the cable holder shown in FIG. 1, may provide a large retention force, so that even two or more cable or line routes having diameters between 25, 30, and even 50 mm are made possible. The handling of the line bundles, which are typically in an order of magnitude of 20 to 30 m long, is simplified, since the bundles or routes may be laid on the cable receiver section and already supported there provisionally. The bundles may then be tensioned and aligned. Final fixing of the bundles to the cable holders is then easily possible using cable binders.

Figure 5:
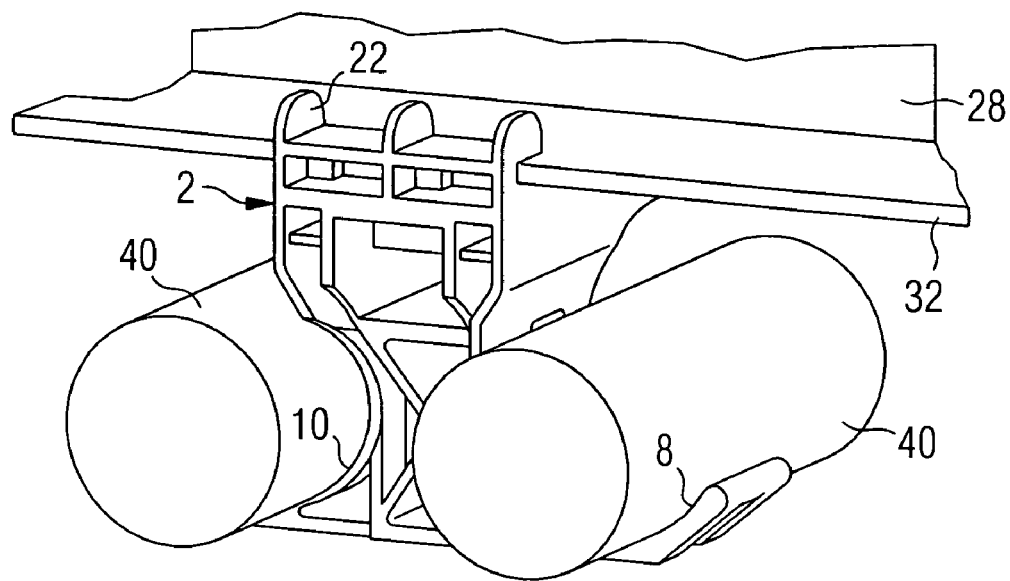
FIG. 5 shows a further perspective view of the cable holder from FIG. 3 having laid line routes.

FIG. 5 shows a further perspective view of the cable holder from FIG. 3, the cable holder being positioned on a support 28 and line routes 40 being laid on the regions 8 and 10. As may be inferred from FIG. 5, the line guide extends essentially perpendicularly to an extension direction of the support 28. According to one exemplary embodiment of the present invention, however, the cable holder may be implemented to provide a line guide essentially parallel to the extension direction of the support. Any arbitrary angles of the cable guide to the extension direction of the support 28 are also possible.

Figure 6:
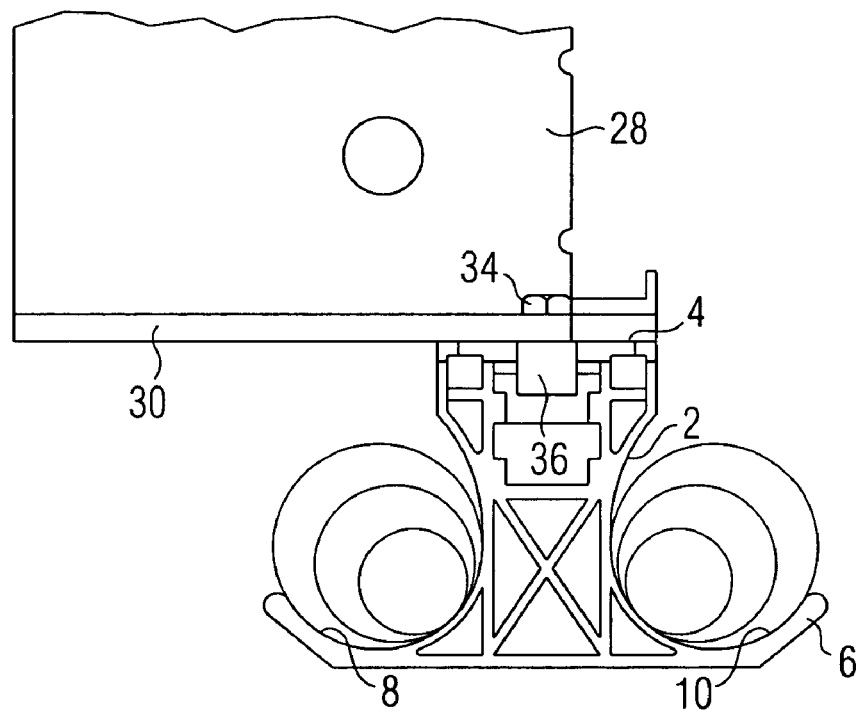
FIG. 6 shows a partial sectional view of the cable holder from FIG. 3.

FIG. 6 shows a sectional view of the cable holder from FIG. 3 in a state mounted on the support 28.

As may be inferred from FIG. 6, the regions 8 and 10 may be tailored to rounded areas of the cable routes having radii between 10 and 20 mm, for example.

As may also be inferred from FIG. 6, the fastening section 4 is implemented to be placed flat on the surface 30 of the support 28 pointing essentially downward.

Figure 7:
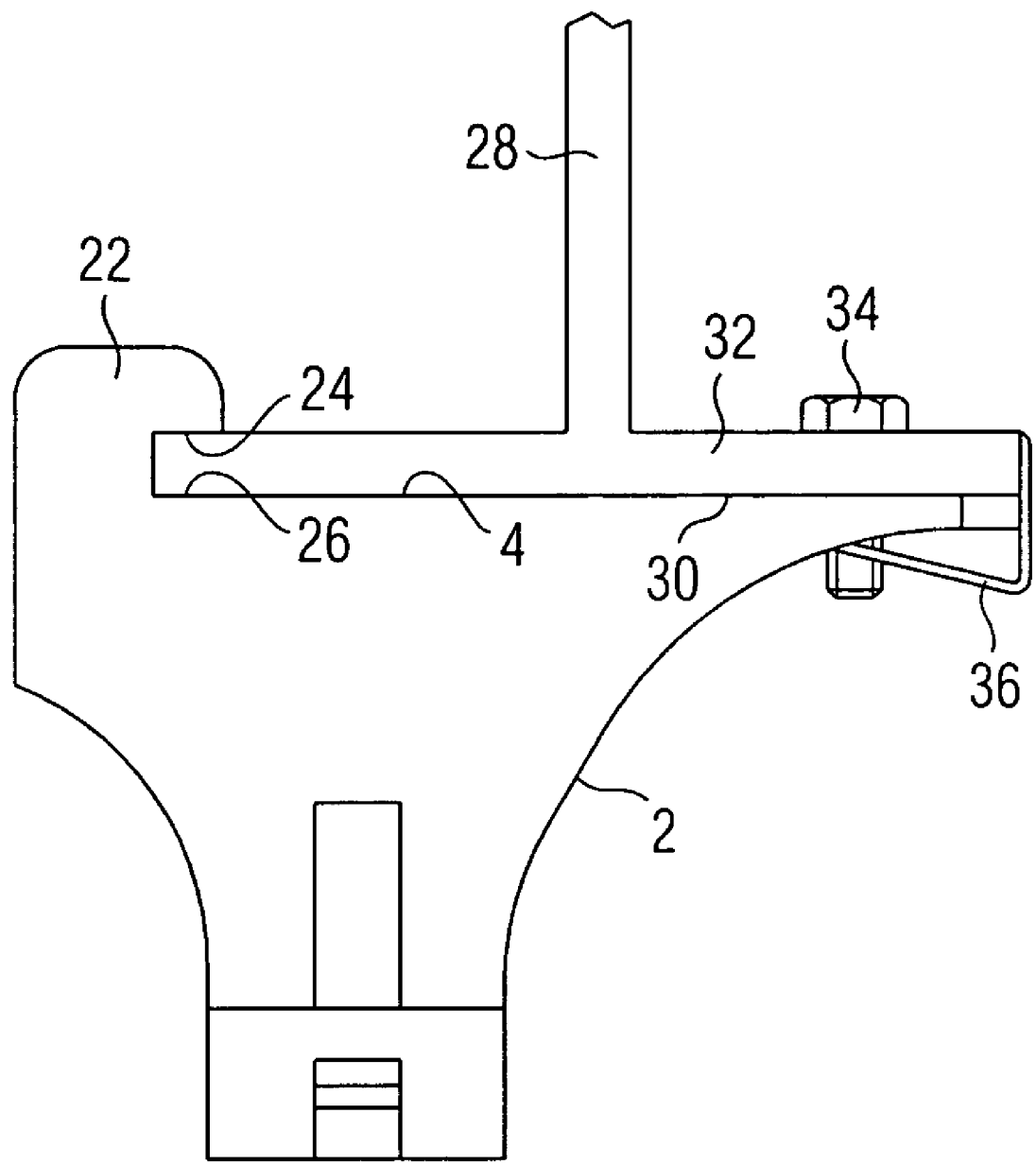
FIG. 7 shows a further partial sectional view of the cable holder from FIG. 3.

FIG. 7 shows a further sectional view of the cable holder from FIG. 3.

As may be inferred from FIG. 7, the cable holder is implemented to be attached to an at least partially T-shaped support 28. The support 28 has a region 32 which has an essentially rectangular cross-section. The claw element 22 has the planar regions 24 and 26, whose distance is tailored to the thickness of the rectangular region 32. The planar regions 24 and 26 are positioned essentially parallel to the surface 30 of the support 28 pointing downward. The support is used for supporting and separating two routes/lines which must have a specific distance because of the safety aspect.

As may be inferred from FIG. 7, the claw element may be positioned on one side of the fastening section 4 in order to enclose an end region of the rectangular section 32. A recess is provided on the other side, through which a screw 34 may be inserted, which may then be screwed into a clip nut 36 that may be provided on the cable holder.

According to the present invention, even heavy cable routes may be installed significantly more easily at installation holes with minimum complexity. For example, free-handed work is possible. Thus, a total weight of the cable support may be reduced.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A cable holder for aircraft, the cable holder comprising a cable receiver section; and
    a main body;
    wherein the main body has a fastening section to be placed on a surface of a support;
    wherein the cable holder is adapted to be attachable to the support, which has a section;
    wherein at least one claw element is provided on the fastening section on one side, which at least one claw element is adapted to at least partially enclose the section;
    wherein a recess is provided on another side of the fastening section for attaching to the surface of the support using a fastener, the fastener not intersecting with the at least one claw element;
    wherein the at least one claw element is mountable onto the section of the support and the cable holder is fixed on to the support using the fastener which is inserted through the recess; and
    wherein the attached cable holder essentially has an inverse T-shaped structure, whose fastening section is attached to a surface pointing essentially downward, wherein the cable holder comprises horizontal regions which are adapted such that a cable can be hid on the horizontal regions.

2. The cable holder of claim 1,
    wherein the fastening section has an opening for attaching the holder to the surface pointing essentially downward using a screw, rivet, or self-locking socket pin.

3. The cable holder of claim 1, wherein the first and second regions are adapted so that cable having a diameter up to 50 mm are layable on the first and second regions.

4. The cable holder of claim 1,
    wherein the cable holder is adapted for attachment to a support which has a section that is essentially rectangular in cross-section;
    wherein the at least one claw element is mountable onto the rectangular section and the cable holder is fixable to the support using a screw, rivet, or self-locking socket pins.

5. The cable holder of claim 1, wherein the cable holder is essentially made of plastic.

* * * * *